United States Patent [19]

Kaizerman et al.

[11] 4,127,542

[45] Nov. 28, 1978

[54] STABILIZATION OF POLYESTER URETHANES USING ORGANIC EPOXIDES

[75] Inventors: Samuel Kaizerman, Bridgewater; Ajaib Singh, Hillsborough Township, Somerset County, both of N.J.

[73] Assignee: American Cyanamid Company, Stamford, Conn.

[21] Appl. No.: 771,285

[22] Filed: Feb. 23, 1977

Related U.S. Application Data

[63] Continuation-in-part of Ser. No. 640,595, Dec. 15, 1975, abandoned, which is a continuation-in-part of Ser. No. 567,570, Apr. 14, 1975, abandoned, which is a continuation of Ser. No. 457,887, Apr. 4, 1974, abandoned, which is a continuation-in-part of Ser. No. 302,369, Oct. 30, 1972, abandoned.

[51] Int. Cl.² .......................... C08K 5/06; C08G 18/10
[52] U.S. Cl. .......................... 260/18 PF; 260/18 TN;
260/30.4 N; 260/45.8 A; 528/60; 528/61; 528/65; 528/73

[58] Field of Search ........ 260/18 PF, 18 TN, 30.4 N, 260/45.8 A, 75 NA, 77.5 SS, 77.5 AN

[56] References Cited

U.S. PATENT DOCUMENTS

| | | | |
|---|---|---|---|
| 3,148,167 | 9/1964 | Keplinger, Jr. | 260/40 TN |
| 3,193,525 | 7/1965 | Kallert et al. | 260/77.5 SS |
| 3,401,144 | 9/1968 | Britain | 260/45.8 A |
| 3,406,140 | 10/1968 | Polestak et al. | 260/45.8 A |
| 3,631,145 | 12/1971 | Kerst | 260/45.8 A |
| 3,835,166 | 9/1974 | Gipson et al. | 260/30.4 N |

FOREIGN PATENT DOCUMENTS 816,688 10/1974 Belgium.
891,552 1/1972 Canada.

*Primary Examiner*—Eugene C. Rzucidlo
*Attorney, Agent, or Firm*—Frank M. Van Riet

[57] ABSTRACT

A storage stable polyester based polyurethane composition is provided which contains from about 0.05 to 0.75 percent by weight of an organic epoxide compound which has a molecular weight of not less than 60.

19 Claims, No Drawings

STABILIZATION OF POLYESTER URETHANES USING ORGANIC EPOXIDES

CROSS-REFERENCE TO RELATED APPLICATIONS

This application is a continuation-in-part of copending application, Ser. No. 640,595, filed Dec. 15, 1975, which, in turn, is a continuation-in-part of Ser. No. 567,570, filed Apr. 14, 1975, which, in turn, is a continuation of Ser. No. 457,887, filed Apr. 4, 1974, which, in turn, is a continuation-in-part of Ser. No. 302,369, filed Oct. 30, 1972 all now abandoned.

Generally stated, the subject matter of the present invention relates to a process for stabilizing polyester based polyurethane compositions against thermal degradation. More particularly, the invention relates to the thermal stabilization of a polyester based polyurethane composition by the addition thereto of an organic epoxy compound.

BACKGROUND OF THE INVENTION

It is generally well recognized in the polyurethane art that polyester polyurethanes tend to undergo thermal degradation during storage.

Attempts have been made to stabilize said polyurethanes, see U.S. Pat. No. 3,193,522, Neumann et al., which discloses the use of polycarbodiimides having a plurality of carbodiimide groups for said purpose. Also, Canadian Pat. No. 891,552 and Belgian Pat. No. 816,688 disclose methods of stabilizing polyester based polyurethanes using epoxides.

Although the carbodiimides afford a degree of stability to the polyester polyurethanes, they are added to stabilize the urethanes against hydrolytic degradation and have not been shown to be effective against thermal degradation. The Canadian and Belgian patents both teach the incorporation of epoxides into polyester based polyurethanes to stabilize them against hydrolytic degradation only. The Canadian patent however, does not disclose the small amounts of epoxide additive used herein or that amounts of epoxide over 1.0% do not impart thermal stability to the urethane.

The Belgian patent, although disclosing low amounts of epoxide additives, does not recognize the criticality of amounts below about 1.0% regarding thermal stability.

Accordingly, it is a primary object of the present invention to provide thermally and storage stable polyesterurethane compositions.

It is another object of the invention to provide a method for the preparation of thermal and storage stable polyesterurethane compositions.

THE INVENTION

In accordance with the objects of the present invention, there is provided a stable urethane composition selected from the group consisting of
(A) the reaction product of
(1) a hydroxyl-terminated polyester,
(2) an aliphatic diol,
(3) optionally, a mixture of an aliphatic diol and a minor amount of an aliphatic polyol having a functionality greater than 2,
(4) an aromatic diisocyanate in an amount essentially stoichiometrically equivalent to the amount of available hydroxy groups of said (1), (2) and (3), and
(5) optionally, a catalyst, and
(B) the reaction product of
(a) an isocyanate-terminated prepolymer composition prepared by reacting a hydroxyl-terminated polyester with an aromatic diisocyanate in an amount stoichiometrically in excess of the amount of available hydroxyl groups in said polyester and
(b) a compound comprising
(I) an aromatic diamine in an amount of from about 75 to about 130% of the amount stoichiometrically required to react with the available isocyanate groups of said (a) or
(II) an aliphatic diol, or a mixture of an aliphatic diol and a minor amount of an aliphatic polyol having a functionality greater than 2, in an amount of from about 80 to about 110% of the amount required to react with the available isocyanate groups of said (a)

said (A) and (B) containing from about 0.05 to about 0.75%, by weight, based on the weight of (A) or (a), of an organic epoxide compound having a molecular weight greater than 60.

Suitable hydroxyl-terminated polyesters useful herein include polyethyleneadipate, polypropyleneadipate, poly(ethylene-propylene)adipate, polybutyleneadipate, polyhexamethyleneadipate, and the like. Other hydroxyl-terminated polyesters are well recognized as useful in polyurethane technology and include those derived from the polymerization of caprolactones and from the condensation of dicarboxylic acids such as succinic, malonic, pimelic, sebacic and suberic acids among others with diols such as ethylene glycol, 1,2-propanediol, 1,3-propanediol, 2,2-dimethyl-1,3-propanediol, 1,4-butanediol, 1,5-pentanediol, 1,6-hexanediol, and the like. Hydroxyl-terminated polyesters derived from polycarboxylic acids and polyhydric alcohols may also be used.

Polyurethanes are prepared by well-known methods whereby one or more of the aforementioned hydroxyl-terminated polyesters is reacted with a stoichiometric excess of an aromatic diisocyanate such as 2,4-tolylenediisocyanate, 2,6-tolylenediisocyanate (and isomeric mixtures thereof), methylenebis (4-phenylisocyanate), or 1,5-naphthalenediisocyanate. The polyester-aromatic diisocyanate reaction product is then further reacted with an aromatic diamine, aliphatic diol or a mixture of said aliphatic diol and a polyol having a functionality greater than 2. The method by which the reactants are reacted to form the polyester urethane elastomeric composition may vary. The polyester polyol may first be reacted with the aromatic diisocyanate to provide an isocyanate-terminated, liquid polyurethane, generally referred to in the art as a "prepolymer" and the prepolymer is then further reacted with the aromatic diamine, diol or diol-polyol mixture to form a "castable" polyurethane. In accordance with our invention, the prepolymer may be stabilized against thermal degradation by incorporating the epoxide therein.

Alternatively, the ingredients may be reacted simultaneously, in which case, no prepolymer is formed. The resultant products are usually referred to as thermoplastic polyurethanes. These thermoplastic polyurethanes may also be stabilized according to our invention.

It is common in the art to distinguish between the castable polyurethanes and the thermoplastic polyurethanes, both of which are contemplated by the present invention, as mentioned above. Castable polyurethanes are usually liquid reaction products of hydroxyl-terminated polyols, e.g. a polyester polyol, and a stoichiometric excess of an aromatic diisocyanate. The castable polyurethane "prepolymer" is subsequently further reacted with an aromatic diamine, aliphatic diol or a mixture of said diol and a polyol having a functionality greater than 2, by mixing, pouring into a mold and heating to cure the reaction mixture to form the elastomeric products. Thermoplastic polyurethanes, on the other hand, are linear, usually solvent soluble, solid elastomeric products ordinarily formed by reaction of a hydroxyl-terminated polyol, e.g. polyester polyol, an aromatic diisocyanate and an aliphatic diol or aliphatic diol-aliphatic polyol mixture, such that the ratio of isocyanate groups to the total of hydroxyl groups is essentially 1, i.e. about 0.9 to about 1.1. The reactants are usually mixed together in the appropriate amounts, often in the presence of a catalyst for the reaction, such as an organotin compound, for example, stannous octoate, and heated to form an elastomeric product.

Useful aromatic diamines include 4,4'-methylenebis (o-chloroaniline), methylenebisaniline, 2,6-dichloro-p-phenylene diamine, and the like.

Useful aliphatic diols include ethylene glycol, 1,4-butanediol, 1,6-hexanediol, the dihydroxyethyl ether of hydroquinone, known as PEHQ, and the like.

Useful aliphatic polyols include glycerol, trimethylol propane, pentaerythritol, and the like. The polyols, all of which have a functionality greater than 2, are used in combination with the aliphatic diol in amounts of up to about 20%, based on the weight of the diol, depending on the properties desired in the resulting elastomer.

The mono-, di- and polyepoxide compounds useful in the present invention are those having a molecular weight greater than 60 and having no other functional groups reactive with the urethane components. These include, but the invention is not limited to, alkyl cycloalkyl and aryl glycidyl ethers; mono- and diepoxidized alkenes and dienes, including epoxidized polymers of dienes, for example 1,2-and 2,3-epoxybutane; cycloalkylene oxides, such as cyclohexene oxide and vinyl cyclohexene diepoxide; diglycidyl ethers of aliphatic diol, such as the diglycidyl ether of 1,4-butane diol; diglycidyl ethers of bisphenols, such as the diglycidyl ether of isopropylidene bisphenol (Bis Phenol A) or diglycidyl ethers of methylene bisphenol, and oligomers thereof; epoxidized unsaturated diglycidyl ethers of polymeric diols and polyglycidyl ethers of polyols, and the like.

The epoxide compound may be incorporated into the urethane composition in several ways. For example, the epoxide may be incorporated into the polyester-terminated polyol before reacting with the diisocyanate to form the isocyanate-terminated prepolymer, or it may be incorporated into the prepolymer per se. In making a thermoplastic it may be incorporated into the polyol reactant, or, if the thermoplastic is made by introducing the reactants as separate streams into a mixing head, as a separate reactant stream, or included with the polyester-terminated polyol, the aliphatic diol or the diol-polyol mixture. Ordinarily the epoxide is added to the prepolymer after it is formed, or it is added to the polyester polyol. The epoxide is used in an amount of about 0.05 to 0.75 percent by weight, preferably from about 0.1 to about 0.6 percent, by weight, based on the weight of the prepolymer or the total reactants depending upon which polyurethane is being prepared. That is to say, if the prepolymer technique is being used, the epoxide concentration is based upon component (a), above, and if a thermoplastic polyurethane is being prepared, the epoxide concentration is based upon composition (A), above.

Ordinarily, the isocyanate-terminated polyurethane prepolymer, containing the epoxide, is further reacted to form an elastomeric product by heating and mixing with a suitable aromatic diamine, aliphatic diol or mixture of said diol and a polyol, pouring the reaction mixture into a suitable mold and continuing to heat until the reaction mixture forms a solid elastomeric product. The aromatic diamine is reacted with the prepolymer in an amount of from about 75 to 130% of the stoichiometrically required amount, preferably about 80 to 100% of the stoichiometric amount. The aliphatic diol or mixture of aliphatic diol and polyol is reacted with the prepolymer in an amount of from about 80 to 110% of the stoichiometrically required amount.

The thermoplastic products are ordinarily made by incorporating the epoxide into the polyester-terminated polyol and then reacting the polyester polyol, aromatic diisocyanate, aliphatic diol or diol-polyol mixture, along with a suitable amount of a catalyst, where needed, such that the ratio of the isocyanate groups to the total of hydroxyl groups of the polyester-terminated polyol, aliphatic diol and aliphatic polyol is about 0.9 to 1.1, preferably about 1.0. The reactants are mixed together and heated to form the solid elastomeric product. Alternatively, and preferably, the several reactants are metered as separate reactant streams to a mixing head, where they react to form the solid product which is then extruded as a thin extrudate and chopped into pellets.

The following examples are set forth for purpose of illustration only and are not to be construed as limitations on the present invention except as set forth in the appended claims. All parts and percentages are by weight unless otherwise specified.

EXAMPLE 1

Preparation of Polyurethane Prepolymer

A prepolymer is prepared by reacting poly(ethyleneadipate) having a molecular weight of about 2000 with tolylene diisocyanate at a ratio (NCO/OH) of 1.8/1. The isocyanate content of the prepolymer is 3.0%.

Evaluation of Stability of Prepolymer

To separate portions of the above prepolymer is added 0.25%, 0.5%, 1.0% and 1.5%, by weight, of epoxidized soya bean oil. The various samples of prepolymer are then aged under the following conditions:
A. 64 hours at 70° C.
B. 160 hours at 70° C.
C. 160 hours at 70° C. + 8 hours at 100° C.

The isocyanate content of the samples is measured following each aging period. These results are given in Table I, below.

TABLE I

| Isocyanate Content of Aged Prepolymers | | | | | |
|---|---|---|---|---|---|
| | | Concentration of Epoxide | | | |
| Aging Period | Unstabilized | 0.25% | 0.5% | 1.0%* | 1.5%* |
| Unaged | 3.00 | 2.98 | 2.99 | 3.00 | 2.94 |
| A | 2.93 | 2.92 | 2.90 | 2.85 | 2.81 |
| B | 2.92 | 2.90 | 2.89 | 2.76 | 2.89 |
| C | 2.89 | 2.80 | 2.77 | 2.70 | 2.67 |

*comparative

The prepolymers are then reacted with methylenebis (o-chloroaniline), using 100% of the stoichiometrically required amount, and compression molded into test sheets. Stress-strain properties are then measured on the test sheets. These data are shown in Table II, below.

TABLE II
Stress-Strain Properties of Aged, Stabilized Polyurethanes

| Property | Conditions of Aging | Concentration of Epoxide | | | | |
| --- | --- | --- | --- | --- | --- | --- |
| | | Control | 0.25% | 0.5% | 1.0%* | 1.5%* |
| 300% Modulus (psi) | Original | 1160 | 1160 | 1120 | 1050 | 890 |
| | A | 1060 | 1080 | 1100 | 990 | 850 |
| | B | 1000 | 980 | 1000 | 800 | 770 |
| | C | 960 | 900 | 820 | 610 | 580 |
| Tensile (psi) | Original | 6620 | 6600 | 7300 | 6700 | 6200 |
| | A | 7300 | 7400 | 7320 | 7160 | 7020 |
| | B | 6800 | 6850 | 7180 | 6800 | 7025 |
| | C | 6775 | 6500 | 6900 | 7020 | 6600 |
| Elongation (%) | Original | 740 | 690 | 730 | 780 | 730 |
| | A | 700 | 660 | 675 | 680 | 680 |
| | B | 670 | 670 | 660 | 670 | 680 |
| | C | 680 | 660 | 680 | 670 | 670 |
| Split Tear (pli) | Original | 450 | 400 | 400 | 410 | 350 |
| | A | 325 | 345 | 375 | 350 | 290 |
| | B | 390 | 360 | 270 | 200 | 235 |
| | C | 270 | 260 | 230 | 175 | 140 |
| Hardness (Shore A) | Original | 80 | 80 | 80 | 80 | 80 |
| | A | 80 | 80 | 80 | 77 | 75 |
| | B | 78 | 78 | 77 | 75 | 70 |
| | C | 76 | 75 | 72 | 70 | 65 |

*comparative

EXAMPLE 2

The procedure of Example 1 is again followed except that the urethane prepolymer is prepared by reacting one equivalent of poly(tetramethylene ether glycol), molecular weight 1000, with 1.7 equivalents of 2,4-tolylenediisocyanate. The resultant prepolymer contains 4.2 percent isocyanate, by weight.

The stabilized prepolymer shows resistance to degradation and stress-strain properties analogous to the compositions shown in Example 1.

EXAMPLE 3

2,4-Tolylenediisocyanate is reacted with polyethyleneadipate (Mol. weight 1800), to produce a prepolymer having an isocyanate content of 3.17 percent, by weight. Specified amounts of various epoxide stabilizers are added and the resultant prepolymers are aged as in Example 1 and are then reacted with an equivalent amount of methylenebis (o-chloroaniline) and compression molded. In each instance, the stabilizing effect of the epoxide additive is substantially the same as shown in Example 1.

Compound
1. 0.6 percent vinyl cyclohexene diepoxide 2. 0.25 percent Styrene Oxide 3. 0.09 percent (3,4-epoxycyclohexyl) acetic acid, (3,4-epoxycyclohexyl) ester 4. 0.75 percent diglycidyl ether of 1,4-butanediol 5. 0.5 percent diglycidyl ether of 4,4'-isopropylidenebisphenol

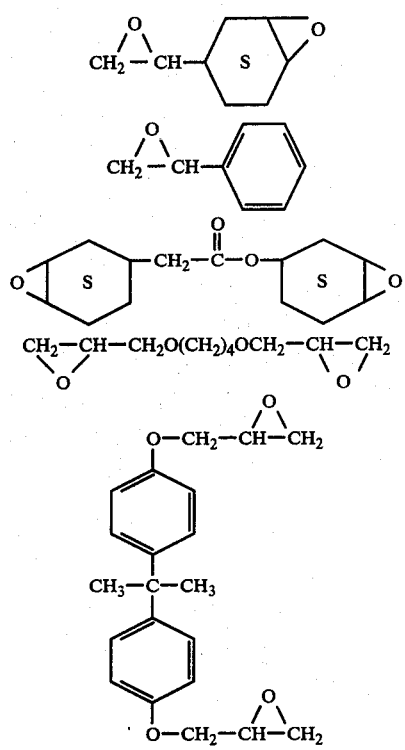

6. 0.35 percent diglycidyl ether of phenol-formaldehyde condensate

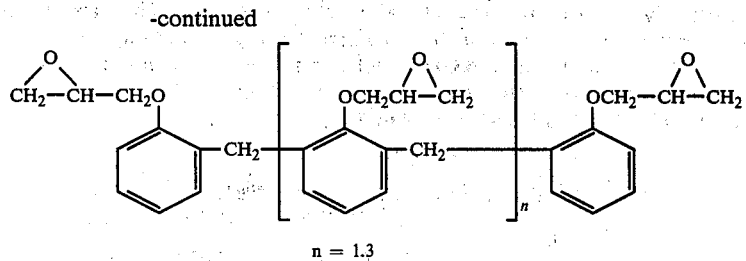

n = 1.3

EXAMPLE 4

A prepolymer is prepared by reacting 2,4-tolylenediisocyanate with 2000 molecular weight polyethylene adipate to an isocyanate content of 4.2%. 0.5 Percent of the glycidyl ether of phenol-formaldehyde condensate shown as Compound 5 above is added and the composition is reacted with a stoichiometric amount of methylenebis(o-chloroaniline). The resultant composition is compression molded and exposed to humid conditions at 200° F/95% R.H. The results are set forth in Table III, below.

TABLE III

| Aging Time (hrs.) | 300% Modulus (psi) | Tensile Strength (psi) |
|---|---|---|
| 0 | 2100 | 6520 |
| 24 | 77* | 69* |
| 48 | 69* | 46* |
| 56 | 62* | 45* |
| 72 | 65* | 34* |
| 96 | 54* | 18* |

*expressed as percent retained.

EXAMPLE 5

The procedure of Example 1 is again followed except that the epoxidized soy bean oil is replaced by a commercially available epoxysilane. Analogous results are achieved.

EXAMPLE 6

The prepolymer of Example 1 is aged with 0.75% of epoxidized soya bean oil and then reacted with a stoichiometric amount of 2,6-dichloro-p-phenylene diamine. The composition additionally contains 0.2% of gzelgic acid and 4.0% of tricresylphosphate. Excellent storage stability of the prepolymer and stress-stain property retention of the cured elastomer produced therefrom are observed.

EXAMPLE 7

A thermoplastic polyurethane is prepared by mixing 2100 grams (1 mole) of polyethyleneadipate with 255 parts of the dihydroxyethylether of hydroquinone, 15 parts of wax and 9 parts of pentaerythrityltetrakis-3-(3,5-di-tert.-butyl-4-hydroxyphenyl) propionate at 100° C. The temperature is lowered to 85° C and 617 parts of molten 4,4-methylenebis (phenylisocyanate) are added. The mixture is poured into trays, allowed to cure for 16 hours at 120° C and granulated.

To separate 300 part portions of the polymer are added (A) 1.5 parts of the diglycidyl ether of 4,4'-isopropylidenebisphenol (epoxy equiv. 290-320) and (B) 1.75 parts of the glycidyl ether of phenol-formaldehyde condensate. The samples are then extruded at 320° F to thoroughly mix the additives and the extrudates compression molded at 390° F. Test specimens were cut and exposed at 200° F/98 percent R.H. Samples were removed at scheduled intervals and physical properties measured. Excellent stability is achieved.

EXAMPLE 8

Samples of (A) and (B) from Example 7 are dissolved in dimethylformamide to provide solutions containing 20 percent (wt.) solids. Films (20 mils) are cast, solvent removed, and exposed at 70° C/98 percent R.H. for a period of 1 week. Samples were then tested for stability. The results are commercially acceptable.

EXAMPLE 9

Polyethylene adipate, 1.0 mole, and 3.0 moles of 1,4-butanediol are mixed together at about 100° C. When thoroughly mixed, 4.2 moles of 4,4-methylenebis (phenyl isocyanate) are added, mixed for about 15-30 seconds, and then 0.45% of diglycidylether of isopropylidenebisphenol in tetrahydrofuran and 0.01% of stannous octoate are added in rapid succession. The reaction mixture is then poured into a tray and allowed to react to form a thermoplastic elastomer by heating in an oven at about 100° C for about 1 hour. The resulting thermoplastic exhibits excellent stability.

We claim:
1. A stable solid elastomeric urethane composition selected from the group consisting of
 (A) the reaction product of
  (1) a hydroxyl-terminated polyester,
  (2) an aliphatic diol,
  (3) optionally, a mixture of an aliphatic diol and a minor amount of an aliphatic polyol having a functionality greater than 2,
  (4) an aromatic diisocyanate in an amount essentially stoichiometrically equivalent to the amount of available hydroxy groups of said (1), (2) and (3), and
  (5) optionally, a catalyst, and
 (B) the reaction product of
  (a) an isocyanate-terminated prepolymer composition prepared by reacting a hydroxyl-terminated polyester with an aromatic diisocyanate in excess of the amount of available hydroxyl groups in said polyester and
  (b) a compound comprising
   (I) an aromatic diamine in an amount of from about 75 to about 130% of the amount stoichiometrically required to react with the available isocyanate groups of said (a) or
   (II) an aliphatic diol, or a mixture of an aliphatic diol and a minor amount of an aliphatic polyol having a functionality greater than 2, in an amount of from about 80 to about 110% of the amount required to react with the available isocyanate groups of said (a)
said (A) and (B) containing from about 0.05 to about 0.75%, by weight, based on the weight of (A) or (a), of an organic epoxide compound having a molecular weight greater than 60 and no other functional groups reactive with the urethane components.

2. A composition according to claim 1 wherein said aromatic diisocyanate is selected from the group consisting of 2,4-tolylene diisocyanate, 2,6-tolylene diisocyanate and isomeric mixtures thereof, 4,4'-methylenebis)-phenylisocyanate) and 1,5-naphthalene diisocyanate.

3. A composition according to claim 1 wherein said reaction product is (B).

4. A composition according to claim 1 wherein said reaction product is (A).

5. A composition according to claim 3 wherein said polyester is poly(ethylene adipate), said aromatic diisocyanate is tolylene diisocyanate and said compound is an aromatic diamine.

6. A composition according to claim 5 wherein said aromatic diamine is 4,4'-methylenebis(o-chloroaniline) or 2,6-dichloro-p-phenylene diamine.

7. A composition according to claim 1 wherein said organic epoxide is epoxidized soybean oil.

8. A composition according to claim 1 wherein said epoxide compound is the diglycidyl ether of 4,4'-isopropylidenebisphenol.

9. A composition according to claim 1 wherein said epoxide compound is the diglycidyl ether of 1,4-butanediol.

10. A composition according to claim 4 wherein said polyester, aromatic diisocyanate and aliphatic diol are reacted together in a manner such that the ratio of isocyanate groups to the total hydroxyl groups is about 0.9 to 1.1.

11. A composition according to claim 10 wherein said aromatic diisocyanate is 4,4'-methylenebis(-phenylisocyanate).

12. A composition according to claim 10 wherein said organic epoxide is added to the reaction mixture before the reaction is completed.

13. A composition according to claim 10 wherein said composition contains a catalytic amount of an organotin compound.

14. A composition according to claim 13 wherein said organotin compound is stannous octoate.

15. A process for the preparation of a solid elastomeric stable storage or thermally urethane composition which comprises (1) reacting a hydroxyl terminated polyester with a stoichiometric excess of an aromatic diisocyanate to produce an isocyanate-terminated prepolymer, (2) adding thereto from about 0.05 to about 0.75%, by weight, based on the weight of said prepolymer, of an organic epoxide compound having a molecular weight greater than 60, and no other functional groups reactive with the urethane components and (3) reacting the isocyanate-terminated prepolymer containing said epoxide compound with from about 75 to about 130 percent of the stoichiometrically required amount of an aromatic diamine or from about 80 to about 110 percent of the stoichiometrically required amount of an aliphatic diol, or a mixture of said diol and a polyol having a functionality greater than 2.

16. A process according to claim 15 wherein said epoxide compound comprises from about 0.1 to about 0.6%, by weight, of said prepolymer.

17. A process for the preparation of a storage or thermally stable urethane composition which comprises reacting together a hydroxyl terminated polyester, an aliphatic diol or mixture of an aliphatic diol and a polyol having a functionality greater than 2 and an aromatic diisocyanate at a temperature of about 100° C, adding to the reaction mixture from about 0.05 to about 0.75%, by weight, based on the weight of said reaction mixture, of an epoxide compound having a molecular weight greater than 60 and no other functional groups reactive with the urethane components, the ratio of the isocyanate groups to the total hydroxyl groups being in the range of about 0.9 to 1.1, and heating said reaction mixture further to provide a solid.

18. A process according to claim 17 wherein there is additionally added to said reaction mixture a catalytic amount of an organotin compound.

19. A process according to claim 18 wherein said aromatic diisocyanate is 4,4'-methylenebis(-phenylisocyanate) and said aliphatic diol is 1,4-butanediol or the dihydroxyethyl ether of hydroquinone.

* * * * *